(12) United States Patent
Haraguchi et al.

(10) Patent No.: US 6,346,795 B2
(45) Date of Patent: Feb. 12, 2002

(54) DISCHARGE CONTROL CIRCUIT OF BATTERIES

(75) Inventors: Akira Haraguchi; Takashi Matsumoto, both of Kasugai (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/769,344

(22) Filed: Jan. 26, 2001

(30) Foreign Application Priority Data

Feb. 29, 2000 (JP) ............................................. 12-053507

(51) Int. Cl.[7] .................................................. H02D 7/00
(52) U.S. Cl. ....................................................... 320/136
(58) Field of Search ................................. 320/135, 136, 320/131, 155, 157, 158, 159

(56) References Cited

U.S. PATENT DOCUMENTS 5,914,586 A * 6/1999 Fujita et al. ................. 320/136
6,052,016 A * 4/2000 Sugiura et al. .............. 327/393
6,111,388 A * 8/2000 Mukainakano ............... 320/134

FOREIGN PATENT DOCUMENTS

| JP | A-5-236677 | 9/1993 |
| JP | A-9-215213 | 5/1997 |

* cited by examiner

*Primary Examiner*—Gregory Toatley
(74) *Attorney, Agent, or Firm*—Arent Fox Kintner Plotkin & Kahn, PLLC

(57) ABSTRACT

A discharge control circuit that securely prevents an over discharge of a battery. The control circuit includes a discharge control switch connected to the battery for cutting off a discharge current of the battery in response to a discharge stop signal. A control circuit is connected to the battery and the discharge control switch generates the discharge stop signal for deactivating the discharge control switch when a voltage of at least one cell reaches a lower limit. The control circuit includes a switch holding circuit for continuously supplying the discharge stop signal to the discharge control switch for a predetermined time after the discharge stop signal is generated regardless of the cell voltage.

13 Claims, 10 Drawing Sheets

DISCHARGE CONTROL CIRCUIT OF BATTERIES

BACKGROUND OF THE INVENTION

The present invention relates to a discharge control circuit for a battery, and more particularly, to a discharge control circuit that prevents an over-discharge of a battery incorporated in a portable electric device.

In recent years, many portable electronic devices have employed lithium ion batteries, and extending the life of such battery will require securely preventing an over-discharge of the battery.

FIG. 1 is a schematic diagram of a conventional discharge control circuit 100. A battery 1 that provides a power supply for a portable electric device includes a lithium ion battery in which three cells 2a, 2b, 2c are connected in series.

The discharge control circuit 100 controls a discharge current flowing in a portable electric device from the battery 1. The control circuit 100 includes a control circuit 3, a discharge control switch 4 connected to the control circuit 3, and a capacitor 5 connected to the control circuit 3. The switch 4 and the capacitor 5 are externally mounted.

The discharge control switch 4 is a P-channel MOS transistor. The positive terminal of the battery 1 is connected to an output terminal t1 via the discharge control switch 4, and the negative terminal thereof is connected to the GND terminal and an output terminal t2.

When the discharge control switch 4 is turned on, a power supply voltage and a discharge current are supplied to the portable electric device from the output terminals t1, t2. When the portable electric device is started to operate, a supply voltage Vcc, which depends on a power supply circuit of the portable electric device, is supplied between the output terminals t1, t2.

The discharge control switch 4 is controlled by a control signal Dout from the control circuit 3. The negative terminals of comparators 6a, 6b, 6c of the control circuit 3 are connected to the positive terminals of the cells 2a, 2b, 2c. The positive terminals of the comparators 6a, 6b, 6c are supplied with a reference voltage Vth that is higher by a specific amount than the voltages at the negative terminals of the cells 2a, 2b, 2c.

The reference voltage Vth is set at, for example, 2.8 V in relation to the cell voltage Vce of 4.2 V when the cells 2a, 2b, 2c are fully charged.

When the cell voltages Vce of the cells 2a–2c exceed 2.8 V, the comparators 6a–6c generate L-level comparator output signals. When the cell voltages Vce of the cells 2a–2c are equal to or lower than 2.8 V, the comparators 6a–6c generate H-level comparator output signals.

The comparator output signals are supplied to a NOR gate 7a, and the output signal of the NOR gate 7a is supplied to the first input terminal of an OR gate 8a and to the first input terminal of an AND gate 9a. When all of the comparator output signals are at L-level, the output signal of the NOR gate 7a goes high. The comparators 6a–6c and the NOR gate 7a form a cell voltage detector 15.

The output signal of the OR gate 8a is supplied to the gate of an N-channel MOS transistor Tr1. The drain (node N1) of the NMOS transistor Tr1 is connected to the first terminal of the capacitor 5 and to a current source 10 that supplies a current I1. The second terminal of the capacitor 5 is connected to the GND.

When the transistor Tr1 is turned on by the OR gate 8a with H-level output signal, the current I1 supplied by the current source 10 flows through the transistor Tr1 as a drain current. When the transistor Tr1 is turned off, the current I1 charges the capacitor 5, and the voltage of the node N1 increases accordingly.

The node N1 is connected to the set terminal S of a latch circuit 11. When the voltage of the node N1 is at the H-level, the output terminal Q of the latch circuit 11 delivers the latch output signal Dout at the H-level.

The reset terminal R of the latch circuit 11 is supplied with the output signal from the AND gate 9a. When output signal of the AND gate 9a is at the H-level, the latch output signal Dout goes low. When an H-level signal is supplied to the set terminal S and to the reset terminal R, the latch circuit 11 outputs the L-level latch output signal Dout.

The latch output signal Dout is supplied to the second input terminal of the OR gate 8a, an inverter circuit 12a, and the gate of the discharge control switch 4. When the latch output signal Dout is at the L-level, the discharge control switch 4 is turned on, and an output voltage Voc, which is substantially equal to the battery supply voltage Vcc, and a discharge current are supplied to the load circuit from the output terminal t1.

The output signal of the inverter circuit 12a is supplied to the first input terminal of a NOR gate 7b, and the output voltage Voc of the output terminal t1 is supplied to the second input terminal of the NOR gate 7b. The output signal of the NOR gate 7b is supplied to the gate of a P-channel MOS transistor Tr2. The source of the transistor Tr2 is supplied with the supply voltage Vcc from the battery 1, and the drain of the transistor Tr2 is connected to a bias generating circuit 13.

When the voltage Voc at the output terminal t1 becomes higher than the threshold Nth of the NOR gate 7b, or when the latch output signal Dout and output signal of the NOR gate 7b are at the L-level, the transistor Tr2 is turned on to supply the bias generating circuit 13 with the supply voltage Vcc.

When supplied with the supply voltage Vcc, the bias generating circuit 13 supplies bias voltages to the current source 10 and the comparators 6a–6c.

The second input terminal of the AND gate 9a is supplied with the output voltage Voc. The AND gate 9a has the same threshold as the NOR gate 7b. The OR gate 8a, the transistor Tr1, the current source 10, the capacitor 5, and the AND gate 9a form a delay time setting circuit 14.

In the discharge control circuit 100, when each of the cell voltages Vce of the cells 2a–2c of the battery 1 is higher than the reference voltage Vth, all of output signals of the comparator are at the L-level, and output signal of the NOR gate 7a is at the H-level. Accordingly, the output signal of the OR gate 8a is at the H-level, the transistor Tr1 is turned on, and the current I1 supplied from the current source 10 flows through the transistor Tr1 as a drain current. As the result, the voltage of the node N1 and the latch output signal Dout are at the L-level. The latch output signal Dout at the L-level turns the discharge control switch 4 on, which supplies the load circuit with the power supply voltage Vcc from the battery 1 via the output terminal t1. At this time, since the voltage Voc at the output terminal t1 is at the H-level, both the input terminals of the AND gate 9a are supplied with the H-level signals, and the H-level AND gate 9a output signal is supplied to the reset terminal R of the latch circuit 11, which holds the latch output signal Dout at the L-level.

Since the NOR gate 7b is supplied with the H-level voltage Voc and the H-level inverter circuit 12a output signal, the output signal of the NOR gate 7b is at the L-level, the transistor Tr2 is turned on, and the bias generating circuit 13 is supplied with the supply voltage Vcc.

As shown in FIG. 2, when at least one of the cell voltages Vce of the cells 2a–2c becomes lower than the reference voltage Vth, at least one of the comparator output signals is at the H-level. Since the output signal of the NOR gate 7a is at the L-level accordingly, the input terminals of the OR gate 8a are supplied with the L-level signals, and the transistor Tr1 is turned off. Thus, the current source 10 supplies the current I1 to charge the capacitor 5, therefore increasing the voltage of the node N1 gradually.

When the voltage of the node N1 reaches the threshold Lth of the set terminal S of the latch circuit 11 at a delay time Td after the transistor Tr1 is turned off, the latch output signal Dout is at the H-level, and the discharge control switch 4 is turned off. In consequence, the output voltage Voc decreases. When the output voltage Voc is lower than the threshold Nth of the NOR gate 7b, the NOR gate 7b output signal is at the H-level, and the transistor Tr2 is turned off, which disconnects the supply of the power supply Vcc to the bias generating circuit 13.

The H-level output signal Dout brings the output signal of the OR gate 8a into an H-level to turn the transistor Tr1 on again, and the potential at the node N1 decreases to the GND level. This operation completely cuts off the current supply from the battery 1 to the load circuit and to the circuits in the discharge control circuit, which prevents an over discharge of the battery 1.

When the cell voltages Vce of the cells 2a–2c exceed the reference voltage Vth of the comparators 6a–6c, the transistor Tr1 is turned on, and the voltage of the node N1 is at the L-level. At this time, since the output signal of the AND gate 9a is at the H-level, the latch output signal Dout is at the L-level, the discharge control switch 4 is turned on, the output voltage Voc, which is substantially equal to the power supply voltage Vcc, and the discharge current are supplied to the load circuit from the battery 1 via the discharge control switch 4.

However, in case that the load circuit connected between the output terminals t1, t2 includes a capacitance, it takes a predetermined time for the output voltage Voc goes lower than the threshold Nth of the NOR gate 7b after the discharge control switch 4 is turned off, and the bias generating circuit 13 is continuously supplied with the power supply voltage Vcc during this time. This case has the drawbacks as follows.

As shown in FIG. 3, when the discharge control switch 4 is turned off to cut off the discharge currents of the cells 2a–2c, there is a possibility that the cell voltage Vce of the cells 2a–2c instantaneously rises to exceed the reference voltage Vth. After the discharge control switch 4 is turned off, before the output voltage Voc goes lower than the threshold Nth of the NOR gate 7b and the AND gate 9a, if the cell voltage Vce exceeds the reference voltage Vth, all of output signals of the comparator are at the L-level, output signal of the NOR gate 7a is at the H-level, and output signal of the AND gate 9a is at the H-level, so that the latch output signal Dout returns to L-level, which turns the discharge control switch 4 on, and therefore starts the discharge operation again. When the cell voltage Vce goes lower than the reference voltage Vth, the discharge control switch 4 is turned off again, after the delay time Td. This operation is repeated until it disappears that the cell voltage Vce rises higher than the reference voltage Vth immediately after the stop of discharge. Therefore, the conventional technique, involving this operation, cannot securely prevent the overdischarge of the battery 1.

SUMMARY OF THE INVENTION

An object of the present invention is to provide a discharge control circuit that securely prevents an overdischarge of a battery.

In one aspect of the present invention a discharge control circuit is provided that controls discharge of a battery including at least one cell. The control circuit includes a discharge control switch, which is connected to the battery, that cuts off a discharge current of the battery in response to a discharge stop signal. A control circuit is connected to the battery and the discharge control switch to generate the discharge stop signal for deactivating the discharge control switch when at least one cell voltage reaches a lower limit. The control circuit includes a switch holding circuit for continuously supplying the discharge stop signal to the discharge control switch for a predetermined time after the discharge stop signal is generated regardless of the cell voltage.

In another aspect of the present invention, a discharge control circuit is provided for controlling discharge of a battery including at least one cell. The control circuit includes a discharge control switch, which is connected to the battery, that cuts off a discharge current of the battery in response to a discharge stop signal. A cell voltage detecting circuit is connected to the battery to generate a cell voltage detection signal when at least one cell voltage reaches a lower limit. A delay time setting circuit is connected to the cell voltage detecting circuit to generate the discharge stop signal after a first predetermined time from the moment that the cell voltage detection signal is generated. A latch circuit is connected to the delay time setting circuit to latch the discharge stop signal and supply the discharge control switch with the latched discharge stop signal. The delay time setting circuit includes a switch holding circuit for invalidating the cell voltage detection signal in a second predetermined time after the latched discharge stop signal is supplied and continuously supplying the latched discharge stop signal in this time.

In another aspect of the present invention, a discharge control circuit is provided for controlling discharge of a battery including at least one cell. The control circuit includes a discharge control switch connected to the battery, for cutting off a discharge current of the battery in response to a discharge stop signal. A cell voltage detecting circuit is connected to the battery to generate a cell voltage detection signal when at least one cell voltage reaches a lower limit. A delay time setting circuit is connected to the cell voltage detecting circuit to generate the discharge stop signal after a first predetermined time from the moment that the cell voltage detection signal is generated. A first latch circuit is connected to the delay time setting circuit to latch the discharge stop signal and supplies the discharge control switch with the latched discharge stop signal. A second latch circuit is connected to the first latch circuit to perform a set operation in response to the latched discharge control signal and invalidate a reset operation of the first latch circuit for a second predetermined time after the latched discharge stop signal is supplied.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
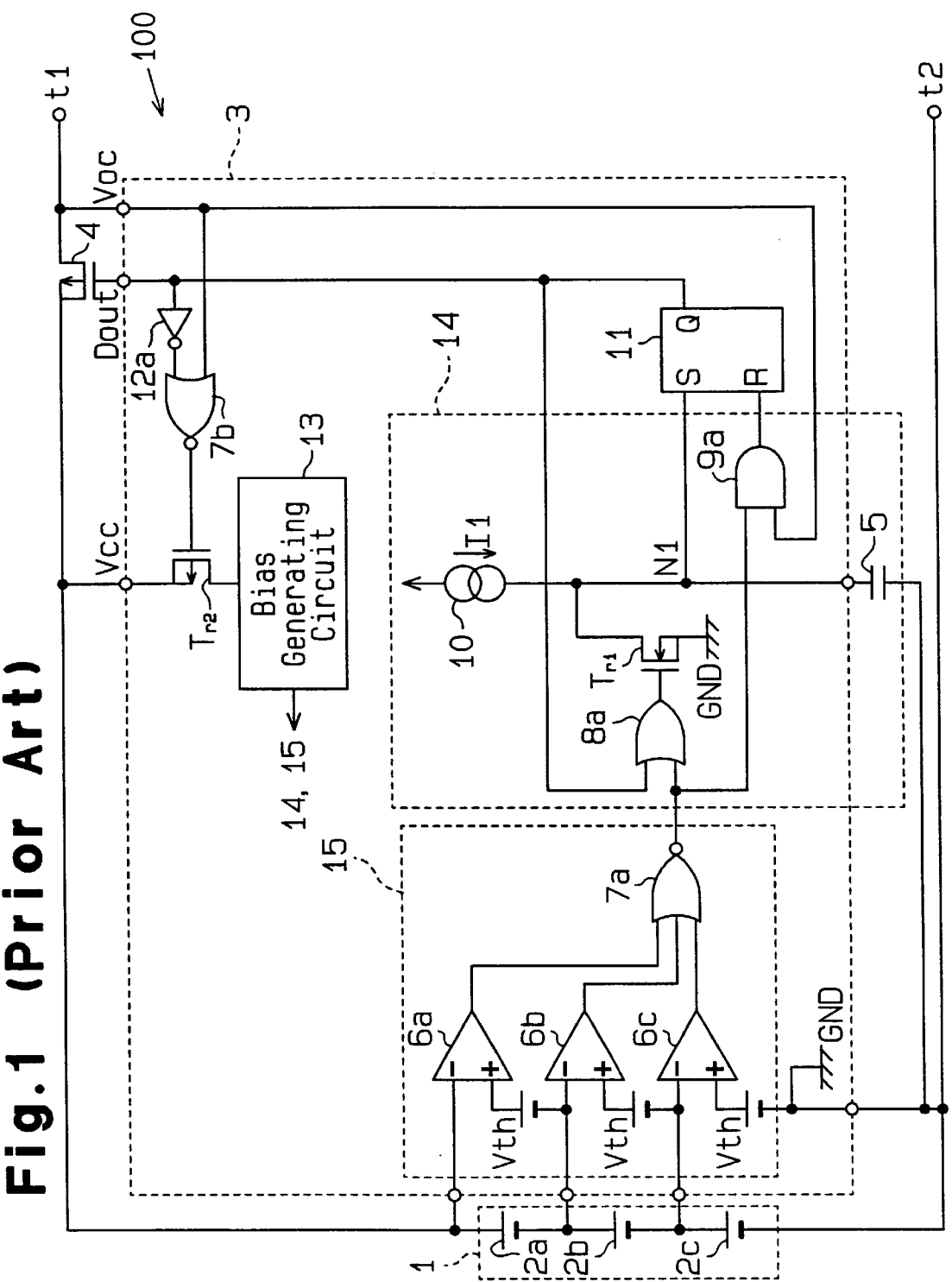
FIG. 1 is a schematic diagram of a conventional discharge control circuit of a battery.
Figure 2:
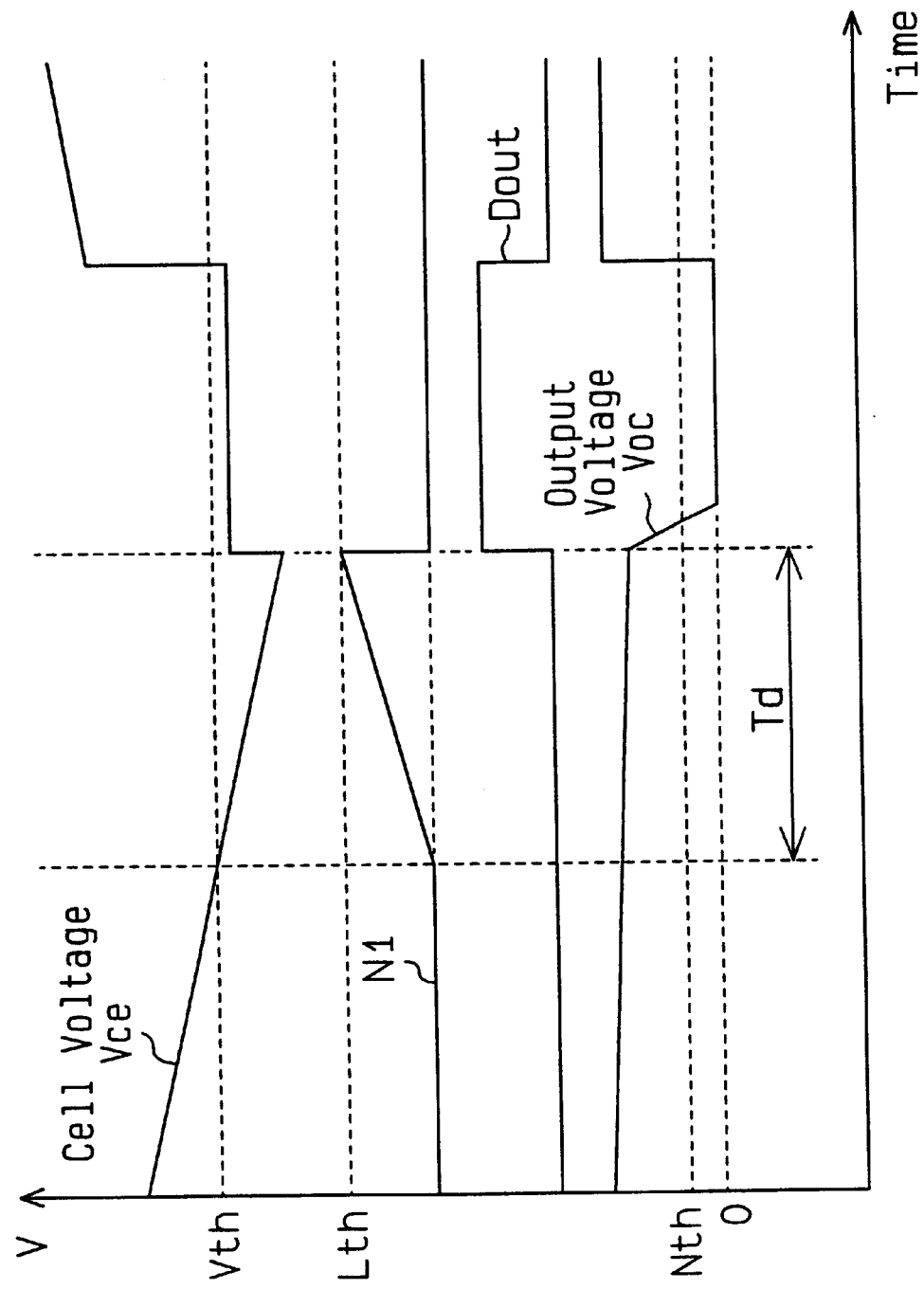
FIG. 2 is a waveform diagram illustrating the operation of the discharge control circuit of FIG. 1.
Figure 3:
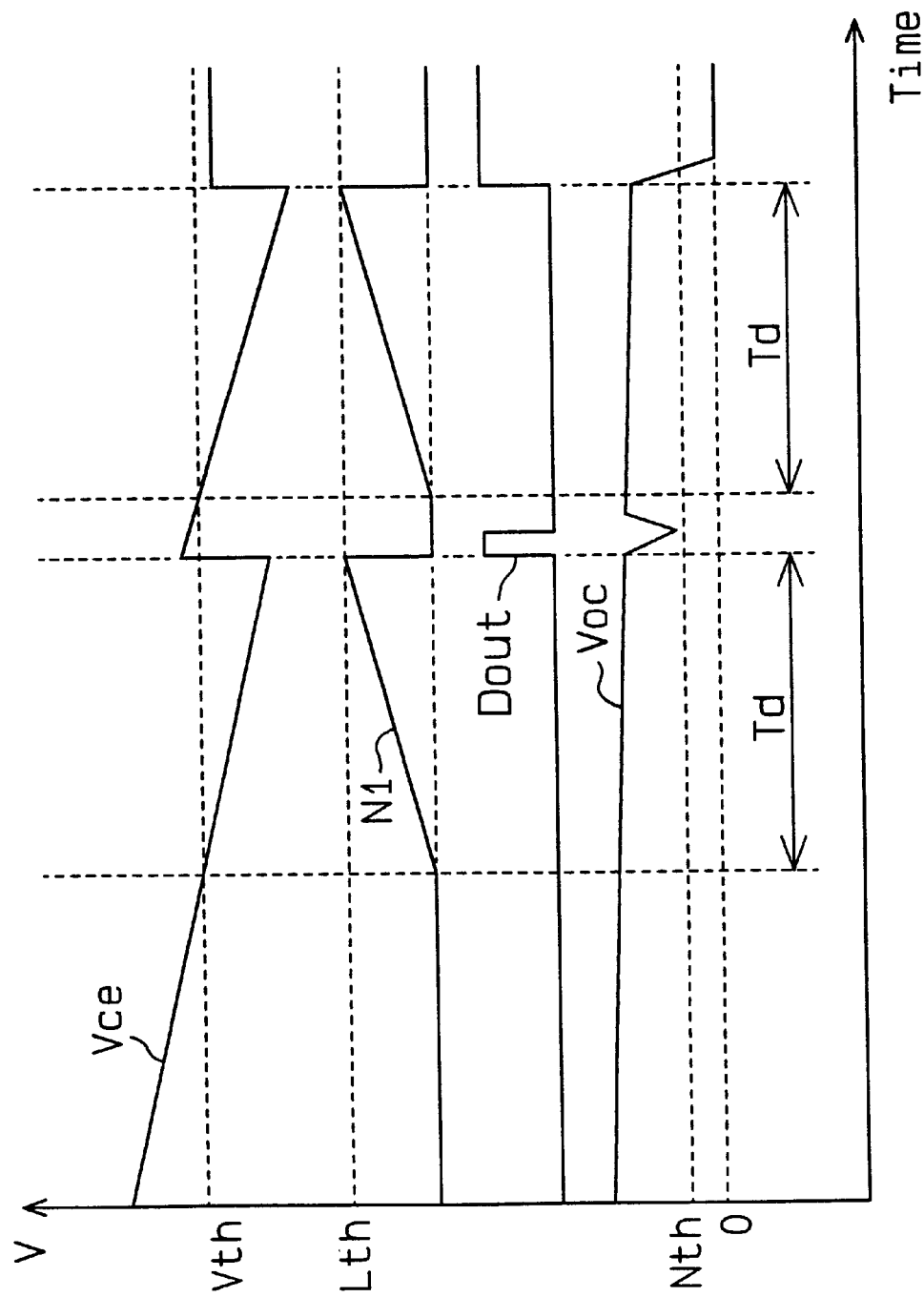
FIG. 3 is a waveform diagram illustrating the operation of the discharge control circuit of FIG. 1.

In the drawings, like numerals are used for like elements throughout.

Figure 4:
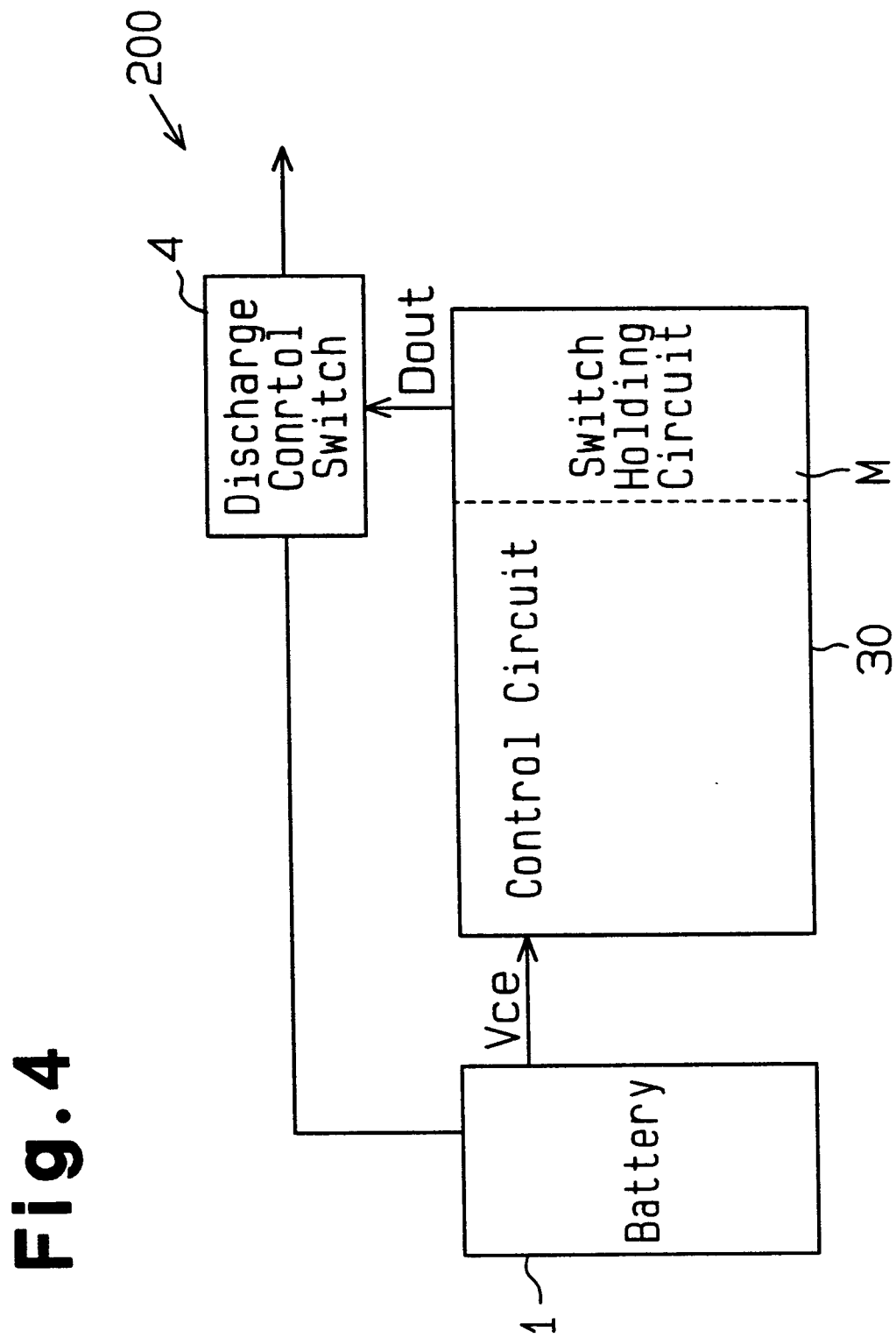
FIG. 4 is a schematic block diagram of a discharge control circuit according to a first embodiment of the present invention.

As shown in FIG. 4, a discharge control circuit 200 according to a first embodiment of the present invention includes a discharge control switch 4 and a control circuit 30. The discharge control switch 4 cuts off a discharge current of the battery 1 in response to a discharge stop signal Dout. The control circuit 30 supplies a discharge stop signal Dout to the discharge control switch 4, which makes the discharge control switch 4 non-conductive when detecting the lower limit of the cell voltage Vce of the battery 1. The control circuit 30 includes a switch holding circuit M that holds the output level of the discharge stop signal Dout for a predetermined time after outputting the discharge stop signal Dout, regardless of variations of the cell voltage Vce.

Figure 5:
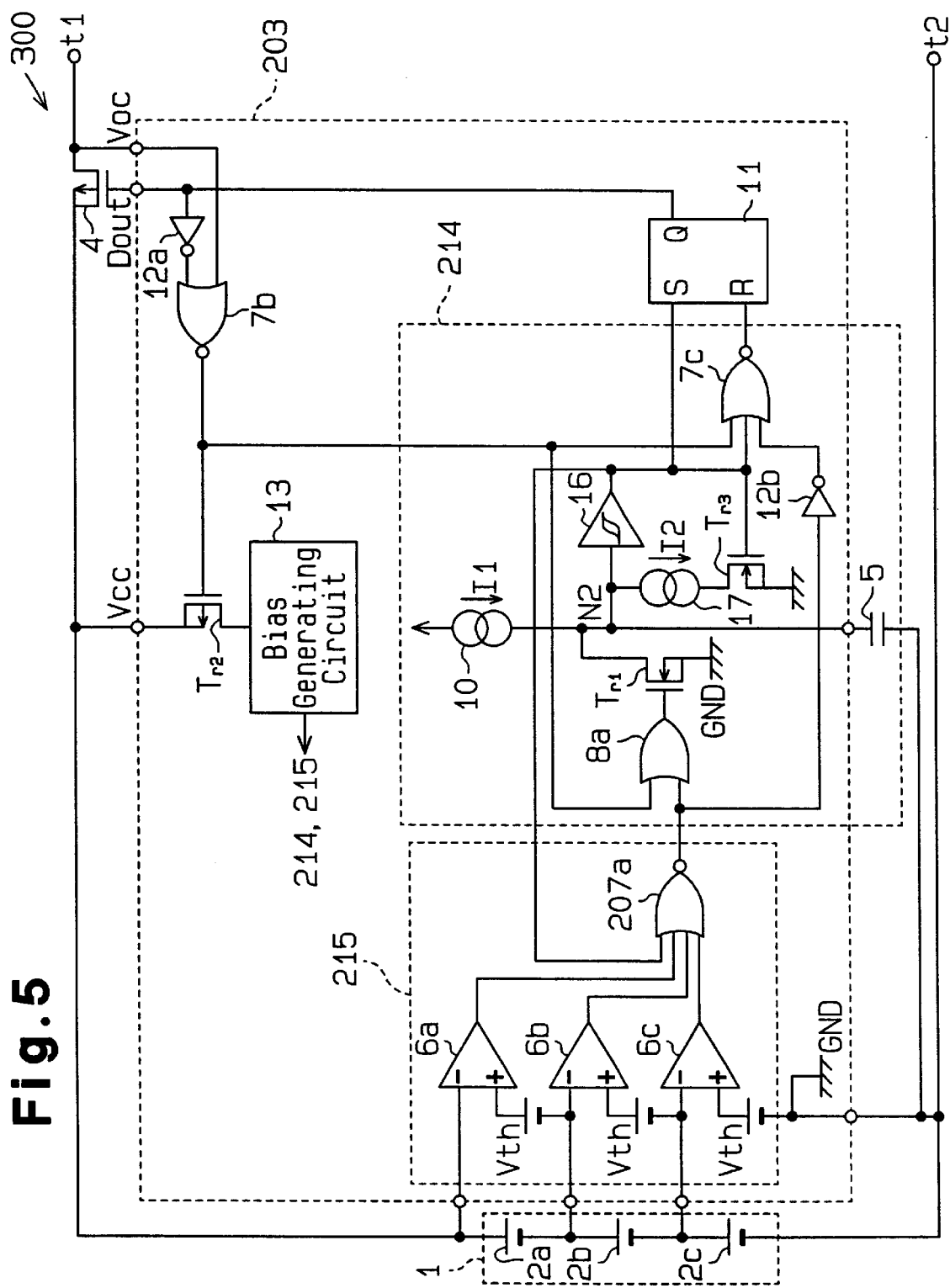
FIG. 5 is a schematic circuit diagram of a discharge control circuit according to a second embodiment of the present invention.

As shown in FIG. 5, a discharge control circuit 300 according to a second embodiment of the present invention is provided with a control circuit 203 including a delay time setting circuit 214 and a cell voltage detecting circuit 215. The delay time setting circuit 214 includes a hysteresis buffer 16 having an input terminal connected to the drain (node N2) of the transistor Tr1. The hysteresis buffer 16 is provided with hysteresis input characteristics, in which the first threshold Vth1 applied when the input voltage rises is higher than the second threshold Vth2 applied when the input voltage falls.

The hysteresis buffer 16 maintains the L-level output signal until the input voltage exceeds the first threshold Vth1 when the input voltage rises. When the input voltage falls, the hysteresis buffer 16 maintains the H-level output signal until the input voltage goes lower than the second threshold Vth2.

The node N2 is connected to the drain of an N-channel MOS transistor Tr3 via a current source 17. The source of the transistor Tr3 is connected to the GND. An output current I2 of the current source 17 is higher than an output current I1 of the current source 10.

The output signal of the hysteresis buffer 16 is supplied to the first input terminal of a NOR gate 7c, the set terminal S of the latch circuit 11, the gate of the transistor Tr3, and a NOR gate 207a of the cell voltage detecting circuit 215.

The second input terminal of the NOR gate 7c is supplied with the output signal of the NOR gate 207a via an inverter circuit 12b, and the third input terminal of the NOR gate 7c is supplied with the output signal of a NOR gate 7b. The output signal of the NOR gate 7b is supplied with the first input terminal of the OR gate 8a of the delay time setting circuit 14.

Next, the operation of the discharge control circuit 300 will be described.

When the discharge control circuit 300 starts to receive a power supply voltage Vcc, and a voltage higher than the threshold Nth of the NOR gate 7b is applied between output terminals t1, t2, the output signal of the NOR gate 7b is at L-level, the transistor Tr2 is turned on, and the supply voltage Vcc is supplied to the bias generating circuit 13. The bias generating circuit 13 supplies the circuits of the discharge control circuit 300 with the bias voltages to activate the discharge control circuit 300. At this time, the hysteresis buffer 16 outputs the L-level output signal.

When the cell voltages Vce of the cells 2a–2c of the battery 1 are higher than the threshold Vth of the comparators 6a–6c, the comparators 6a–6c generate L-level comparator output signals. Accordingly, all the input terminals of the NOR gate 207a are supplied with the L-level signals, the output signal of the NOR gate 207a is at H-level, and the transistor Tr1 is turned on by the H-level output signal of the OR gate 8a. Thus, the output current I1 of the current source 10 flows through the transistor Tr1, the node N2 is maintained substantially at the GND level, and the hysteresis buffer 16 output signal is maintained at the L-level. At this time, the inverter circuit 12b outputs the L-level output signal. Consequently, the output signal of the NOR gate 7c is at the H-level, the latch output signal Dout is at the L-level, and the discharge control switch 4 is turned on. In this state, when the voltage supply between the output terminals t1, t2 is stopped, the discharge current is supplied to the load circuit from the battery 1 via the output terminals t1, t2. At this time, the transistor Tr3 is turned off.

Figure 6:
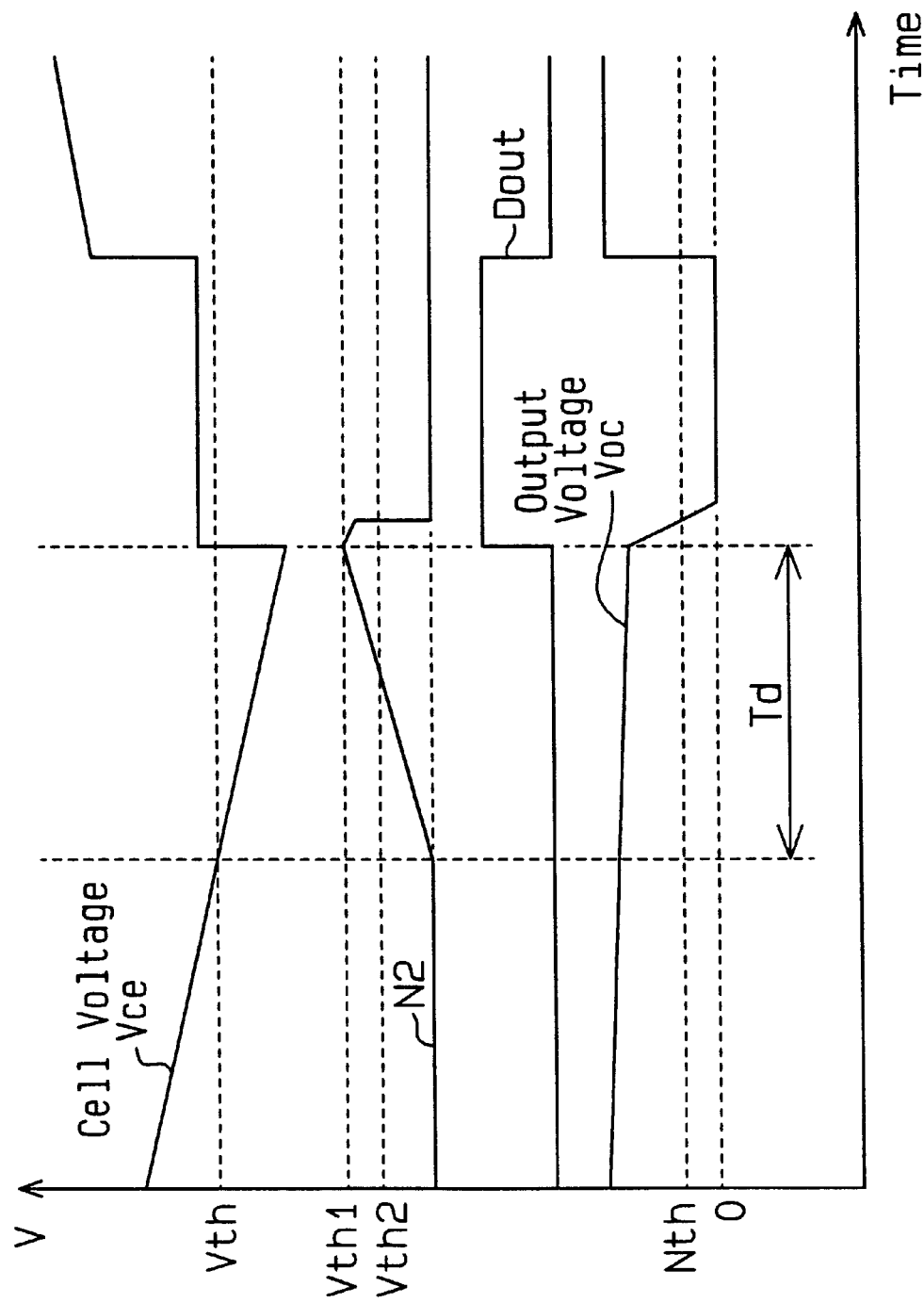
FIG. 6 is a waveform diagram illustrating the operation of the discharge control circuit of FIG. 5.

As shown in FIG. 6, as the discharge from the battery 1 continues and at least one of the voltages Vce of the cells 2a–2c goes lower than the threshold Vth, any one of the comparators 6a–6c outputs the H-level comparator output signal, and the output signal of the NOR gate 207a is at the L-level. Accordingly, both the input terminals of the OR gate 8a are supplied with the L-level signals, and the OR gate 8a output signal is at the L-level to turn the transistor Tr1 off.

When the transistor Tr1 is turned off, the output current I1 of the current source 10 charges the capacitor 5, thus gradually increasing the voltage of the node N2. When the voltage of the node N2 reaches the first threshold Vth1 of the hysteresis buffer 16 after a predetermined time Td, the output signal of the hysteresis buffer 16 is at the H-level, and the latch output signal Dout is at the H-level. In consequence, the discharge control switch 4 is turned off to decrease the output voltage Voc of the output terminal t1, and the output signal of the NOR gate 7c is at the L-level.

At this time, the transistor Tr3 is turned on, and the current I2 of the current source 17 flows through the transistor Tr3 from the node N2. Since the current I2 is higher than the current I1, the electric charges of the capacitor 5 are absorbed in the current source 17, whereby the voltage of the node N2 gradually lowers. Before the voltage of the node N2 lowers to the second threshold Vth2 of the hysteresis buffer 16, when the output voltage Voc falls lower than the threshold Nth of the NOR gate 7b, both the input terminals of the NOR gate 7b are supplied with the L-level signals, and the output signal of the NOR gate 7b is at the H-level to turn the transistor Tr2 off, thereby deactivating the bias generating circuit 13.

The H-level output signal of the NOR gate 7b brings the output signal of the OR gate 8a to H-level, which turns the transistor Tr1 on and lowers the voltage of the node N2 to the GND level. As the result, the supply of the bias voltages from the bias generating circuit 13 is stopped, so that the current consumption of the discharge control circuit 300 is reduced to zero.

After the discharge control switch 4 is turned off, the output signal of the hysteresis buffer 16 is maintained at the H-level before output voltage Voc goes lower than the threshold Nth of the NOR gate 7b, even if the cell voltages Vce of the cells 2a–2c of the battery 1 recover the threshold Vth or higher. Accordingly, the output signals of the NOR gate 207a and the OR gate 8a are maintained at the L-level. Since the output signal of the NOR gate 7c is maintained at the L-level, the latch output signal Dout is maintained at the H-level. Thus, the discharge will not be resumed, although the cell voltage Vce recovers the threshold Vth or higher immediately after the stop of discharge.

The discharge control circuit 300 of the second embodiment has the following advantages.

(1) After discharging operation is stopped by turning the discharge control switch 4 off, the discharge control switch 4 is securely maintained the off state, so that the over discharge of the battery 1 can be securely prevented before output voltage Voc goes lower than the threshold Nth of the NOR gate 7b, even if the cell voltage Vce recovers the threshold Vth of the comparators 6a–6c or higher.

(2) After at least one of the cell voltages Vce of the cells 2a–2c becomes lower than the threshold Vth, discharging operations are securely stopped, so that the over discharge of the battery 1 can be securely prevented.

(3) After at least one of the cell voltages Vce of the cells 2a–2c becomes lower than the threshold Vth, intermittent discharging operations are prevented, so that malfunctions of the load circuit (electric device) can be prevented.

(4) The time required for the voltage of the node N2 lowering from the first threshold Vth1 of the hysteresis buffer 16 to the second threshold Vth2 is determined by the voltage difference between the thresholds Vth1, Vth2, the currents of the current sources I1, I2, and the capacitance of the capacitor 5. By setting that time longer than the time for the output voltage Voc becomes lower than the threshold Nth of the NOR gate 7b after the discharge control switch 4 is turned off, the aforementioned advantages can be achieved.

Figure 7:
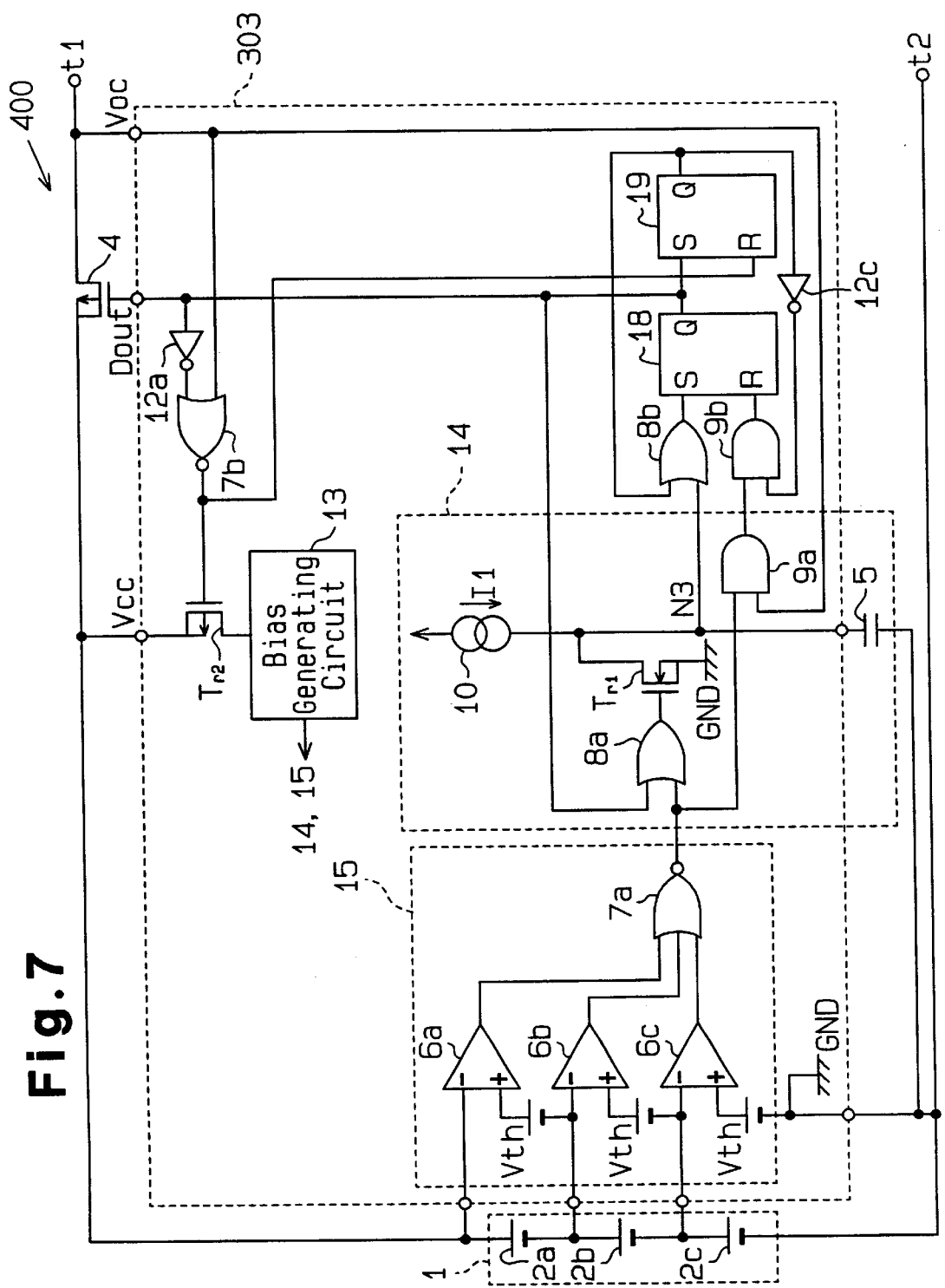
FIG. 7 is a schematic circuit diagram of a discharge control circuit of the third embodiment of FIG. 6.

As shown in FIG. 7, a control circuit 303 of a discharge control circuit 400 according to a third embodiment of the present invention includes latch circuits 18, 19, an OR gate 8b, and an AND gate 9b.

The drain (node N3) of the transistor Tr1 is connected to the first input terminal of the OR gate 8b, and the output signal of the OR gate 8b is supplied to the set terminal S of the latch circuit 18.

An output signal of AND gate 9a is supplied to the first input terminal of the AND gate 9b, and an output signal of the AND gate 9b is supplied to the reset terminal R of the latch circuit 18.

The output signal Dout of the latch circuit 18 is supplied to the gate of the discharge control switch 4, the inverter circuit 12a, and the set terminal S of the latch circuit 19.

The reset terminal R of the latch circuit 19 is supplied with the output signal of the NOR gate 7b, and the output signal of the latch circuit 19 is supplied to the second input terminal of the OR gate 8b and to the second input terminal of the AND gate 9b via an inverter circuit 12c.

Next, the operation of the discharge control circuit 400 will be described.

After the discharge control circuit 400 starts to receive a power supply voltage Vcc, if a voltage between output terminals t1, t2 is lower than the threshold Nth of the NOR gate 7b and at the L-level, the NOR gate 7b output signal is at the H-level, the reset terminal of the latch circuit 19 is supplied with an H-level signal, and the output signal of the latch circuit 19 is at the L-level.

Next, when a voltage higher than the threshold Nth of the NOR gate 7b is applied between output terminals t1, t2, the output signal of the NOR gate 7b is at the L-level, the transistor Tr2 is turned on, and the supply voltage Vcc is supplied to the bias generating circuit 13. Thus, the bias generating circuit 13 supplies the circuits of the discharge control circuit 400 with the bias voltages to activate the discharge control circuit 400.

In this state, when the cell voltages Vce of the cells 2a–2c are higher than the threshold Vth of the comparators 6a–6c, the comparators 6a–6c generate L-level comparator output signals. Accordingly, all the input terminals of the NOR gate 7a are supplied with the L-level signals, the output signals of the NOR gate 7a and the OR gate 8a are at the H-level to turn the transistor Tr1 on. Thus, the output current I1 of the current source 10 flows through the transistor Tr1, and the node N3 is maintained substantially at the GND level. Accordingly, both the input terminals of the OR gate 8b are supplied with the L-level signals, and the output signal of the OR gate 8b is at the L-level. Both the input terminals of the AND gate 9a are supplied with the H-level signals, and the output signal of the AND gate 9a is at the H-level. Thus, both the input terminals of the AND gate 9b are supplied with the H-level signals, and the output signal of the AND gate 9b is at the H-level.

The latch circuit 18 outputs the L-level latch output signal in response to the L-level output signal of the OR gate 8b and the H-level output signal of the AND gate 9b, and the discharge control switch 4 is turned on. In this state, when the voltage supply between the output terminals t1, t2 is stopped, the discharge current is supplied to the load circuit from the battery 1 via the output terminals t1, t2.

Figure 8:
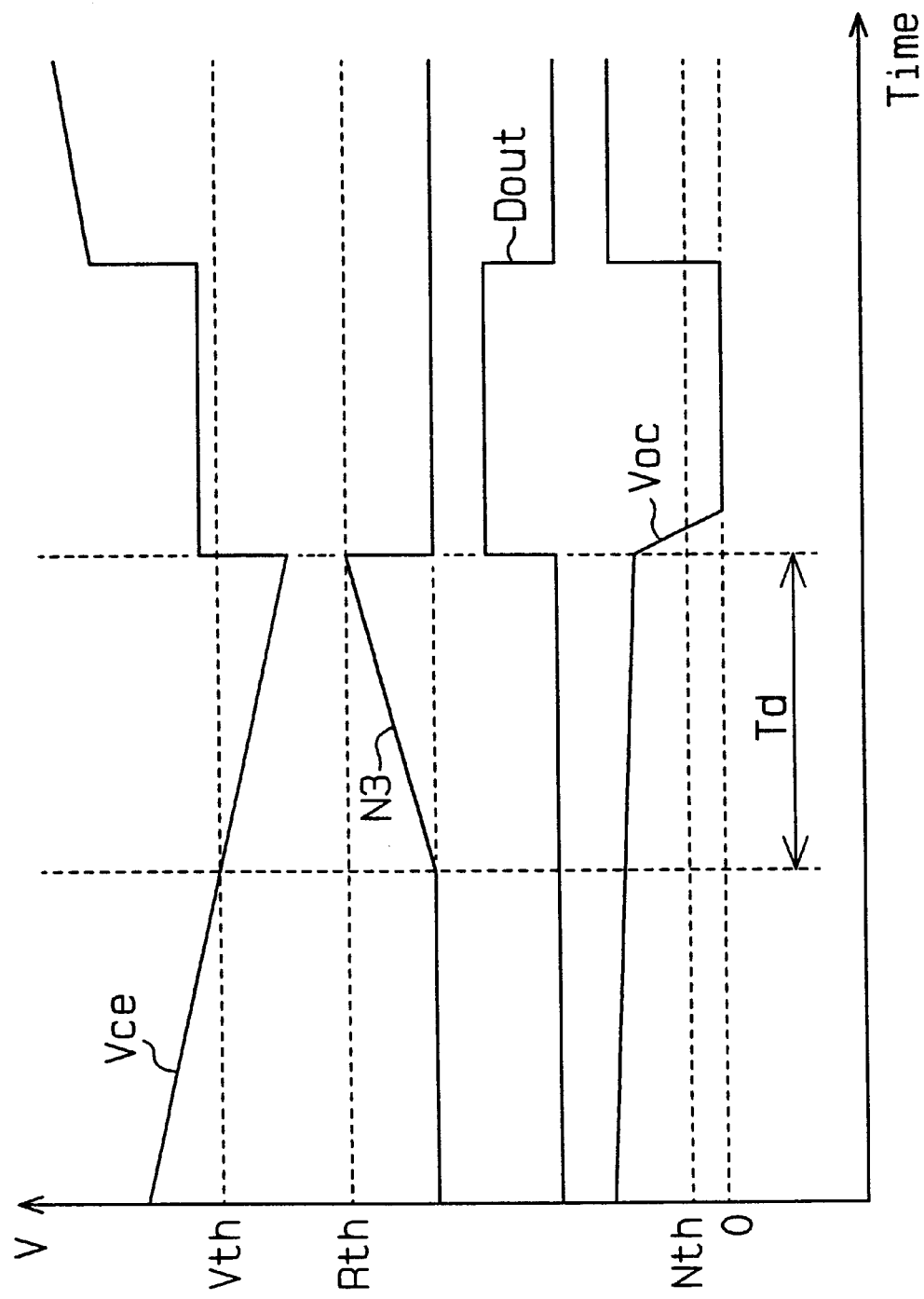
FIG. 8 is a waveform diagram illustrating the operation of the discharge control circuit of FIG. 6.

As shown in FIG. 8, as the discharge from the battery 1 continues and at least one of the cell voltages Vce of the cells 2a–2c goes lower than the threshold Vth, any one of the comparators 6a–6c outputs the H-level output signal, the output signal of the NOR gate 7a is at the L-level.

Accordingly, both the input terminals of the OR gate 8a are supplied with the L-level signals, and the output signal of the OR gate 8a is at the L-level to turn the transistor Tr1 off. At that time, the output signals of the AND gate 9a and the AND gate 9b are at the L-level.

When the transistor Tr1 is turned off, the output current I1 of the current source 10 charges the capacitor 5, which gradually increases the voltage of the node N3. The output signal of the OR gate 8b is at the H-level when the voltage of the node N3 exceeds the threshold Rth of the OR gate 8b after a predetermined time Td from the moment of the transistor Tr1 is turned off, and the output signal Dout of the latch circuit 18 is at the H-level. In consequence, the discharge control switch 4 is turned off to decrease the output voltage Voc of the output terminal t1.

Since the set terminal of the latch circuit 19 is supplied with the H-level latch signal from the latch circuit 18, the output signal of the latch circuit 19 is at the H-level. Accordingly, the output signal of the OR gate 8b is maintained at the H-level.

When the output voltage Voc goes Lower than the threshold Nth of the NOR gate 7b, both the input terminals of the NOR gate 7b are supplied with the L-level signals, and the output signal of the NOR gate 7b is at the H-level to turn the transistor Tr2 off, thereby deactivating the bias generating circuit 13.

The H-level output signal of the NOR gate 7b is supplied to the reset terminal of the latch circuit 19, and the output signal of the latch circuit 19 is reset at the L-level. Consequently, the bias generating circuit 13 stops generating the bias voltages, whereby the current consumption of the discharge control circuit 400 is reduced to zero.

As shown in FIG. 8, by the operation of the latch circuit 19, the output signal of the OR gate 8b is maintained at the H-level and the output signal of the AND gate 9b is maintained at the L-level even if the cell voltage Vce recovers the threshold Vth or higher after the discharge control switch 4 is turned off before the output voltage Voc goes lower than the threshold Nth of the NOR gate 7b. Accordingly, the output signal Dout of the latch circuit 18 is maintained at the H-level. Thus, the discharge is not be resumed, although the cell voltage Vce recovers the threshold Vth or higher immediately after the stop of discharge.

Figure 9:
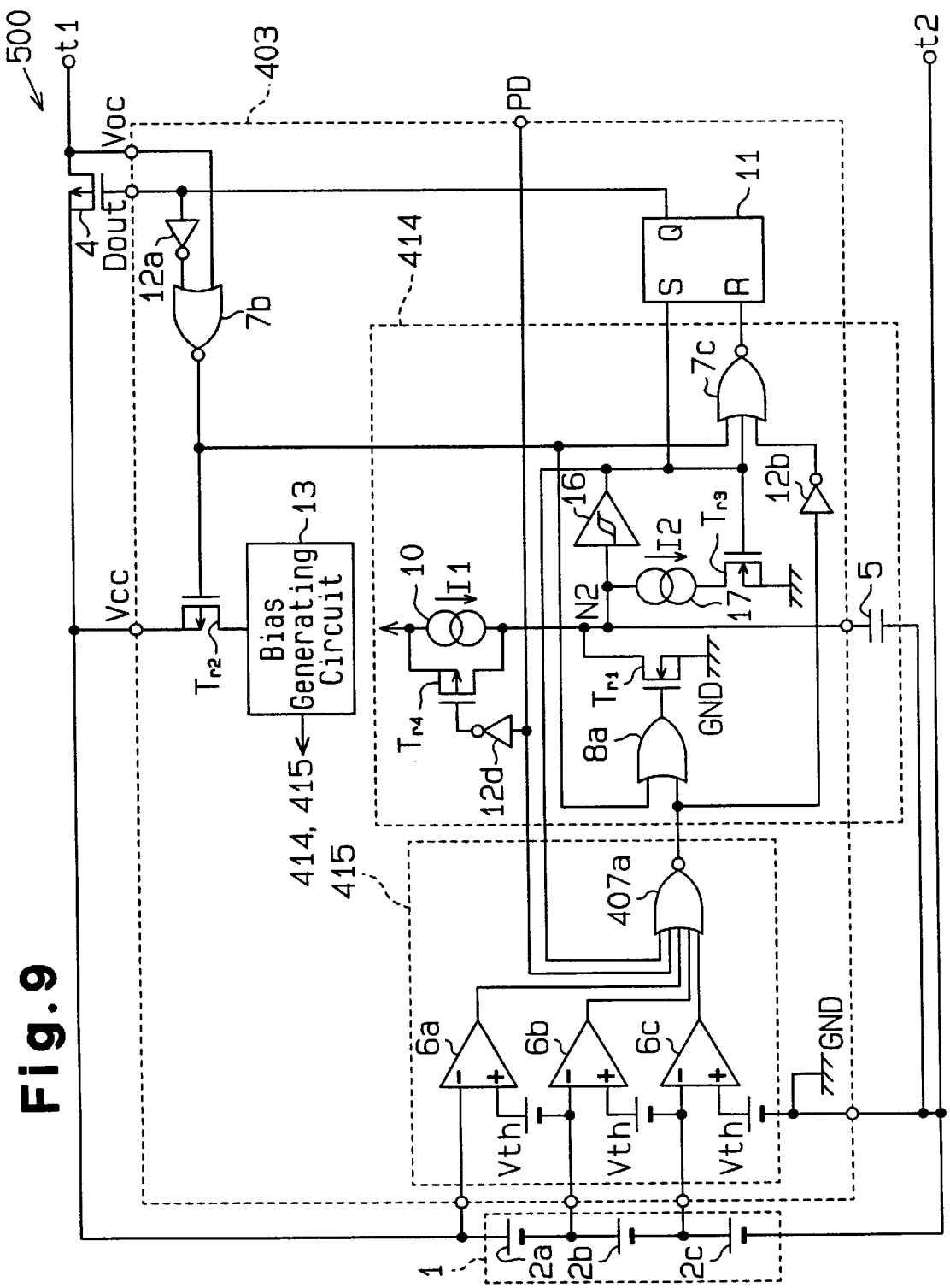
FIG. 9 is a schematic circuit diagram of a discharge control circuit according to a fourth embodiment of the present invention.

As shown in FIG. 9, a control circuit 403 of a discharge control circuit 500 according to a fourth embodiment of the present invention includes a delay time setting circuit 414 and a cell voltage detecting circuit 415. The discharge control circuit 500 stops the discharging operation forcibly in accordance with the instruction from an external device.

A power down signal PD is supplied to a NOR gate 407a of the cell voltage detecting circuit 415 from the external device. A P-channel MOS transistor Tr4 is connected in parallel to the current source 10, and the power down signal PD is supplied to the gate of the transistor Tr4 via an inverter circuit 12d.

When an H-level power down signal PD is supplied, the output signal of the NOR gate 407a is at the L-level to turn the transistor Tr1 off, the voltage of the node N2 rises, and the output signal of the hysteresis buffer 16 is at the H-level. Accordingly, the output signal Dout of the latch circuit 11 is at the H-level to turn the discharge control switch 4 off. At that time, the transistor Tr4 is turned on, and both the drain current of the transistor Tr4 and the current I1 supplied from the current source 10 charge the capacitor 5. Accordingly, the voltage of the node N2 rises quickly. Further, the operations except for the forcible stop operation by the power down signal PD are the same as in the second embodiment.

In the discharge control circuit 500, supplying the H-level power down signal PD stops the discharging operation swiftly. Further, the power down signal PD stops the discharging operation regardless of the output voltage of the battery 1, and eliminates the current consumption of the discharge control circuit 500 itself. This is effective for the long-term preservation of the battery 1.

Figure 10:
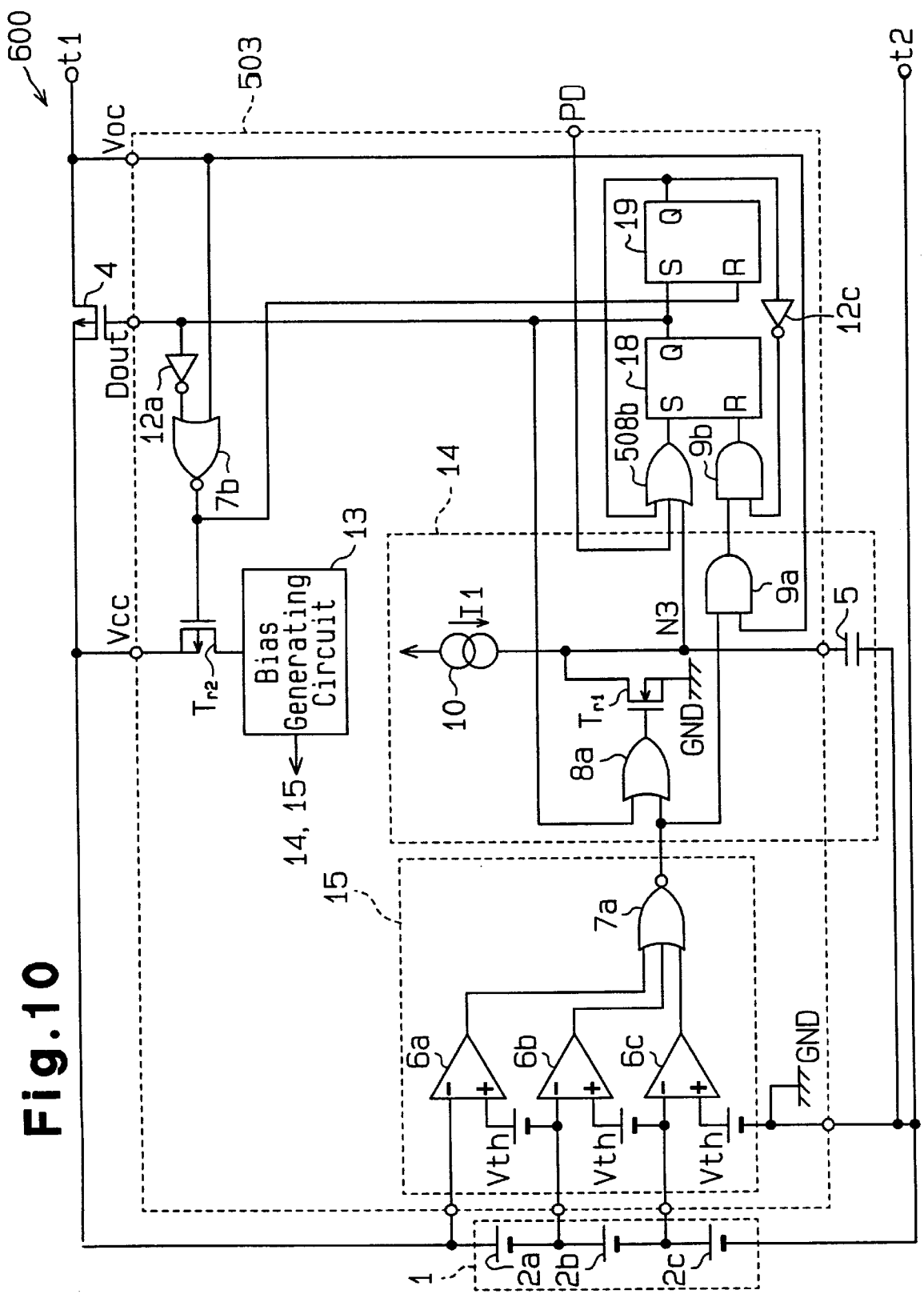
FIG. 10 is a schematic circuit diagram of a discharge control circuit according to a fifth embodiment of the present invention.

As shown in FIG. 10, a control circuit 503 of a discharge control circuit 600 according to a fifth embodiment of the present invention stops the discharging operation forcibly in accordance with the instruction from an external device.

The power down signal PD is supplied to the third input terminal of an OR gate 508b from the external device. When an H-level power down signal PD is supplied from the external device, the output signal of the OR gate 508b and the output signal Dout of the latch circuit 18 are at the H-level. Accordingly, the discharge control switch 4 is turned off.

Further, the operations except for the forcible discharge stop operation by the power down signal PD are the same as in the third embodiment.

In the discharge control circuit 600, supplying the H-level power down signal PD stops the discharging operation swiftly. Further, the power down signal PD stops the discharging operation regardless of the output voltage of the battery 1, and eliminates the current consumption of the discharge control circuit 600 itself. This is effective for the long-term preservation of the battery 1.

It should be apparent to those skilled in the art that the present invention may be embodied in many other specific forms without departing from the spirit or scope of the invention. Therefore, the present examples and embodiments are to be considered as illustrative and not restrictive and the invention is not to be limited to the details given herein, but may be modified within the scope and equivalence of the appended claims.

What is claimed is:

1. A discharge control circuit for controlling discharge of a battery including at least one cell comprising:

a discharge control switch connected to the battery for cutting off a discharge current of the battery in response to a discharge stop signal; and a control circuit connected to the battery and the discharge control switch for generating -the discharge stop signal that deactivates the discharge control switch when a voltage of at least one cell reaches a lower limit, wherein the control circuit includes a switch holding circuit for continuously supplying the discharge stop signal to the discharge control switch for a predetermined time after the discharge stop signal is generated.

2. The discharge control circuit according to claim 1, wherein the control circuit comprises:

a bias generating circuit for generating a bias voltage; and a bias voltage control circuit connected to the bias generating circuit for stopping the bias generating circuit to generate the bias voltage on the basis of the discharge stop signal and an output voltage of the discharge control switch after cutting off the discharge current.

3. The discharge control circuit according to claim 1, wherein the control circuit generates the discharge stop signal in response to a power down signal.

4. A discharge control circuit for controlling discharge of a battery including at least one cell comprising:

a discharge control switch connected to the battery for cutting off a discharge current of the battery in response to a discharge stop signal;

a cell voltage detecting circuit connected to the battery for generating a cell voltage detection signal when a voltage of at least one cell reaches a lower limit;

a delay time setting circuit connected to the cell voltage detecting circuit for generating the discharge stop signal after a first predetermined time from the moment that the cell voltage detection signal is generated; and a latch circuit connected to the delay time setting circuit for latching the discharge stop signal and supplying the discharge control switch with the latched discharge stop signal, wherein the delay time setting circuit includes a switch holding circuit for invalidating the cell voltage detection signal for a second predetermined time after the latched discharge stop signal is supplied and continuously supplying the latched discharge stop signal for the second predetermined time.

5. The discharge control circuit according to claim 4, wherein the delay time setting circuit includes a charge circuit for generating a charged voltage in response to the cell voltage detection signal to perform a charging operation, and the switch holding circuit includes:
   a hysteresis buffer connected to the charge circuit for generating the discharge stop signal in accordance with the charged voltage; and
   a discharge circuit connected to the hysteresis buffer for decreasing the charged voltage in response to the discharge stop signal.

6. The discharge control circuit according to claim 5, wherein the hysteresis buffer has a first threshold applied during the rising of the charged voltage and a second threshold applied during the falling of the charged voltage, and wherein the second threshold is lower than the first threshold.

7. The discharge control circuit according to claim 6, wherein the discharge stop signal is supplied to the cell voltage detecting circuit as an invalid signal for invalidating the cell voltage detection signal.

8. The discharge control circuit according to claim 4, wherein the control circuit comprises:
   a bias generating circuit connected to the cell voltage detecting circuit and the delay time setting circuit for generating a bias voltage supplied to the cell voltage detecting circuit and the delay time setting circuit; and
   a bias voltage control circuit connected to the bias generating circuit for stopping the bias generating circuit to generate the bias voltage on the basis of the discharge stop signal and an output voltage of the discharge control switch after cutting off the discharge current.

9. The discharge control circuit according to claim 4, wherein the cell voltage detecting circuit generates the cell voltage detection signal in response to a power down signal.

10. The discharge control circuit according to claim 9, wherein the delay time setting circuit generates the discharge stop signal in response to the power down signal, after a time shorter than the first predetermined time.

11. A discharge control circuit for controlling discharge of a battery including at least one cell comprising:
   a discharge control switch connected to the battery for cutting off a discharge current of the battery in response to a discharge stop signal;
   a cell voltage detecting circuit connected to the battery for generating a cell voltage detection signal when a voltage of at least one cell reaches a lower limit;
   a delay time setting circuit connected to the cell voltage detecting circuit for generating the discharge stop signal after a first predetermined time from the moment that the cell voltage detection signal is generated;
   a first latch circuit connected to the delay time setting circuit for latching the discharge stop signal and supplying the discharge control switch with the latched discharge stop signal; and
   a second latch circuit connected to the first latch circuit for performing a set operation in response to the latched discharge control signal and invalidating a reset operation of the first latch circuit for a second predetermined time after the latched discharge stop signal is supplied.

12. The discharge control circuit according to claim 11, wherein the control circuit comprises:
   a bias generating circuit connected to the cell voltage detecting circuit and the delay time setting circuit for generating a bias voltage supplied to the cell voltage detecting circuit and the delay time setting circuit; and
   a bias voltage control circuit connected to the bias generating circuit for stopping the bias generating circuit to generate the bias voltage on the basis of the discharge stop signal and an output voltage of the discharge control switch after cutting off the discharge current.

13. The discharge control circuit according to claim 11, wherein the first latch circuit supplies the discharge control switch with the latched discharge stop signal in response to a power down signal.

* * * * *